United States Patent Office 3,361,089
Patented Jan. 2, 1968

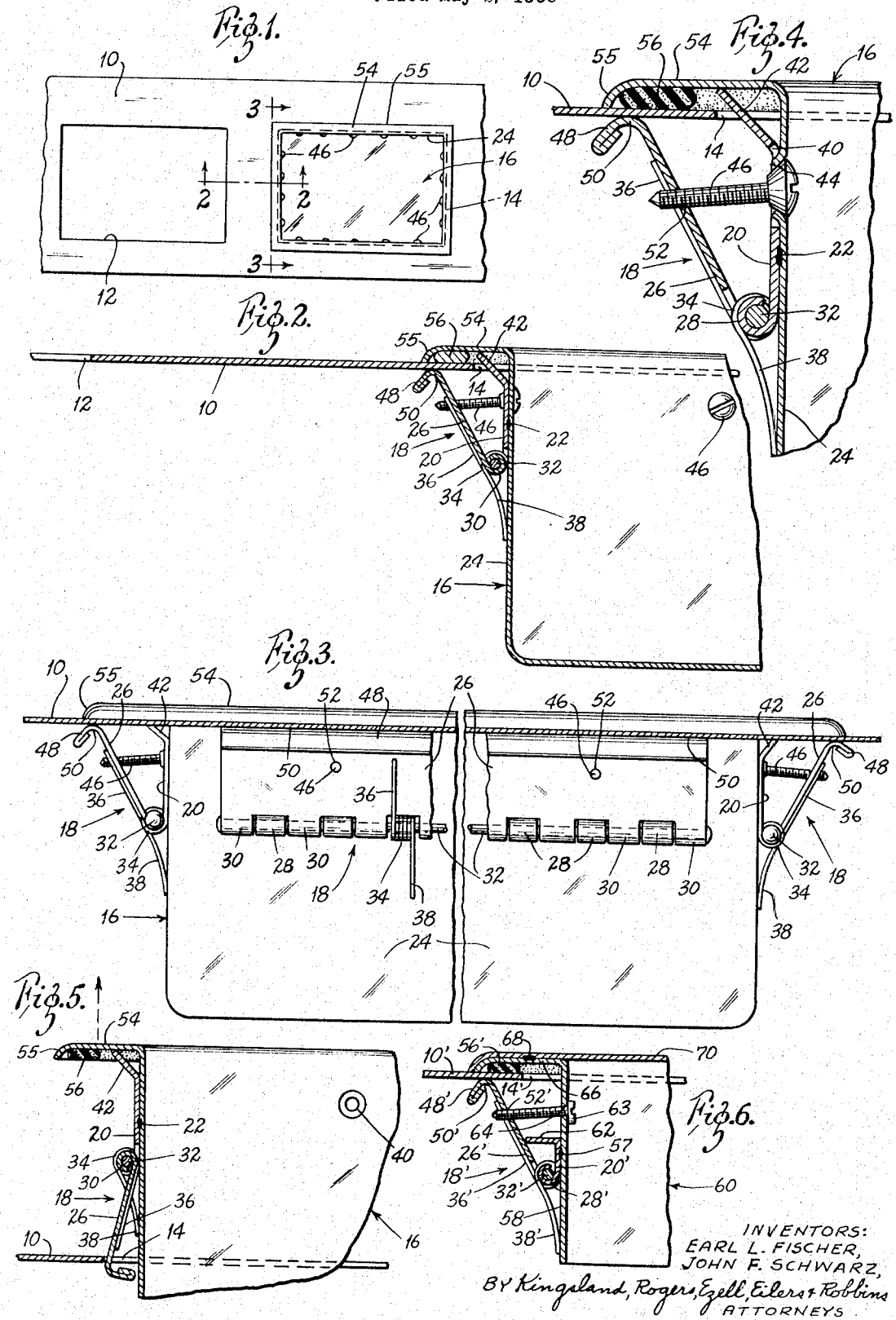

3,361,089
CLAMPING STRUCTURE
Earl L. Fischer, Rogers, Ark., and John F. Schwarz, Affton, Mo., assignors to Hercules Galion Products, Inc., Galion, Ohio, a corporation of Delaware
Filed May 2, 1966, Ser. No. 552,370
11 Claims. (Cl. 108—25)

ABSTRACT OF THE DISCLOSURE

A clamping structure for removably holding a basin, sink, and the like, in position in an opening which is manipulable from within the basin or sink to secure or to loosen the same comprising a first member adapted to be welded or otherwise secured to the outer wall of a supported basin, pan, and the like, a second member hingedly connected to the first member for pivotal movement in respect thereto, a spring biasing the second member towards the first member, and a screw extending through an opening in the basin and threadedly engaging the second member for moving the second member towards the first member to engage the free end of the second member with the underside of the basin's support to secure the basin in place and for moving the second member away from the first member to release the same.

---

The present invention relates generally to clamping structures, and more particularly to a novel clamping structure for effectively and conveniently mounting a walled basin, pan, support, or the like, within an opening and supported by the surrounding platform, or the like, within which the opening is formed.

Thousands of clamping structures have been devised and many are in use today. However, there has long been the need for a simple, convenient clamping structure by means of which a basin, pan, or the like, may be readily mounted in and removed from an opening in a counter, stand, or the like. For convenience and ease in mounting and in removing the basin or support, the securing elements should be available from a position above the support or within the basin, rather than beneath them.

In brief, the present novel clamping structure includes a first portion adapted to be welded or otherwise secured to the outer surface of a wall of a supported basin, pan, or the like, a second portion hingedly connected to or adjacent the first portion adapted to engage beneath the supporting platform, or the like, and screws drawing the second towards the first portion applied and removed from within the basin. A spring biases the second portion towards the first portion.

Therefore, objects of the present invention are to provide a clamping structure which fulfills the long existing need, which enables the mounting of a basin, pan, or the like, within the opening of a counter, or the like, without going or reaching beneath the latter to engage or remove securing elements; which is highly effective in its application, yet is simple to apply; which finds wide use for its intended purpose; which can be employed in mounting basins, apertured supports, etc., in place as aforesaid and removing them therefrom repeatedly as required, over a long period of time without repair of the clamping structure; which is relatively inexpensive; and which otherwise fulfills the objects and advantages sought therefor.

The foregoing and other objects and advantages are apparent from the following description taken with the accompanying drawings, in which:

FIGURE 1 is a top plan view of a fragment of a counter or table adapted to receive cooking units, or the like, a pan being mounted in an opening therein by means of the present novel clamping structure;

FIGURE 2 is an enlarged vertical longitudinal cross-sectional view taken on substantially the line 2—2 of FIGURE 1;

FIGURE 3 is an enlarged vertical transverse cross-sectional view taken on substantially the line 3—3 of FIGURE 1;

FIGURE 4 is a further enlarged view of the clamping structure;

FIGURE 5 is an enlarged vertical longitudinal cross-sectional view taken on substantially the line 2—2 of FIGURE 1, but with the screws removed and the basin lifted vertically from the counter; and FIGURE 6 is a cross-sectional view similar to FIGURE 2 illustrating a modified form of the clamping structure.

Referring to the drawings more particularly by reference numerals, in FIGURE 1 there is shown a fragment of a cooking counter 10 in which are formed adjacent openings 12 and 14. In the opening 14 is a basin or pan 16, which may be employed for any desired cooking purpose. The basin 16 is removably mounted in the opening 14 by means of the present novel clamping structure 18, details of a preferred embodiment of which are clearly illustrated in FIGURES 2–5.

The clamping structure 18 includes a first strip or plate 20 which is spot-welded, as at 22, or otherwise secured to the outer face of the wall 24 of the basin 16. A second strip or plate 26 is pivotally connected to the strip 20 by a piano-hinge construction including looped segments 28 and 30 formed integral with the strips 20 and 26, respectively, and the usual rod 32 extending through said aligned segments 28 and 30. A torsion type spring 34 is mounted on the rod 32 in place of one or more segments 28 deleted for this purpose, and includes free extremities 36 and 38, respectively engaging the outer surface of the wall 24 and the outer surface of the strip 26 to bias the strip 26 towards the strip 20.

The strip 20 includes longitudinally spaced apertures 40 and an upper flanged portion 42. The flanged portion 42 extends above the platform 10 and aids in the initial centering of the basin 16 in the opening 14. Apertures 44 are punched in the wall 24 of the basin 16 to provide a countersunk seat for the heads of screws 46, being aligned with the apertures 40.

The strip 26 includes an upper flange 48 having a turned back free edge. The flange bend is rounded at 50 for engagement with the underside of the counter 10. Suitably threaded apertures 52 are formed in the strip 26 in alignment with the apertures 40 and 44 which receive the screws 46.

Integral with the wall 24 is a flange 54 terminating in a curved portion 55 which engages the counter 10. Between the flange 54 and the counter 10 is a sealing strip 56.

One clamping structure 18 is described above. The same clamping structure 18 is welded to the other three sides on walls of the basin 16. As illustrated, the clamping structure 18 includes strips 20 and 26. The strips 20 and 26 may be reduced to short segments, if desired, and one or more mounted on a wall or side of the basin 16.

FIGURE 5 illustrates the position of the strip 26 as the basin 16 is being removed from the counter 10. The rounded portion 50 permits the strips 26 to slide outwardly in the initial upward movement of the basin 16 and then to continue pivoting to the position of FIGURE 5 as it is engaged by the edge of the opening 14 in the withdrawal of the basin 16. The spring arm 36 will yield to permit this pivotal action of the strip 26. When the basin 16 is returned to the opening 14, the strip 26 is held in the position of FIGURE 5, or a little closer to the wall 24, as the basin 16 is moved downwardly. It is a simple matter for one man to hold four strips 26 in the position of FIGURE 5 by holding the basin 16 at diagonally opposed corners during the installation movement. Once the basin 16 is disposed within the opening 14 and centered by the flange 42, the screws 46 can be inserted, since the spring 36 will return the strip 26 to the position of FIGURES 2 and 4.

In FIGURE 6 is illustrated a modification of the clamping structure 18 generally designated 18'. The clamping structure 18' includes a first strip or plate 20', which is spot-welded at 57 to the depending leg 58 of a member 60. A second strip or plate 26' is pivotally connected to the strip 20' by a piano-hinge construction similar to that shown in FIGURES 1–5.

The strip 20' includes an outwardly directed flange 62, which serves as a stop to limit tightening movement of the strip 26'. A screw 63 extends through an aperture 64 in the depending leg 58 and operatively through a threading of the strip 26'.

The strip 26' has an upper flange 48' having a turned back free edge. The flange bend is rounded at 50' for engagement with the underside of a counter 10', as shown.

The member 60 includes a horizontal leg 66 which is spot welded at 68 to the underside of a support member 70. A sealing strip 56' is provided, as illustrated. The support member 70 may be the base for a hot plate and include openings for hot plate burners, etc. (not illustrated). Such openings would provide access to the screws 63.

The clamping structure 18' is operated like the clamping structure 18 in the mounting of the support 70 on and removing it from the counter 10'. The flange 62 does limit pivotal movement of the strip 26' and will warn against stripping threads of the apertures 52' or deforming of the strip 26'.

Palpably, the present clamping structure may take other configurations for particular adaptations without departing from the principles of the invention.

It is apparent that there has been provided a novel clamping structure which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

Bracketed reference numerals have been provided only as ready identification of concerned parts of the disclosed structure, and not by way of limitation.

What is claimed is:

1. A clamping structure comprising a first member (20) adapted to be secured to a support (24), a second member (26) pivotally mounted in respect to said first member for movement towards and away from it, said second member being biased (34) towards said first member, and means (46) for manually drawing said second member towards said first member with the bias and against a resistance (10), said means being accessible for manipulation at a point in respect to a support (24) on which said structure (18) is adapted to be secured which is remote from the first (20) and second (26) members.

2. The combination of claim 1 and including a support in the form of a pan-like item (16) having side walls (24) and supporting flanges and in which said drawing means (46) are accessible from within said pan, said clamping structure (18) being mounted exteriorly on a side wall (24) of the pan (16), said resistance comprising the underside of a counter (10) and the like.

3. The combination of claim 2 in which said drawing means (46) is at least a screw member which extends through the supporting wall (24) and threadedly engages the pivotally mounted second member (26) for drawing and repelling the same.

4. The combination of claim 3 in which said second member (26) includes a free end (48) formed (50) to engage the underside of a counter and to slide thereover in clamping and unclamping movements.

5. The combination of claim 1 in which said first member (20') includes stop means (62) limiting pivotal movement of the second member (26') towards said first member (20').

6. In combination, a supporting counter (10) and the like, an opening (14) in the counter (10), a unit (16) having a flange structure (54) overlying the counter (10) and at least a vertical wall (24) extending into the opening (14), and a clamping structure (18) for releasably maintaining the unit (16) in position in the opening (14) comprising a first member (20) mounted on the outer surface of the wall (24), a second member (26) pivotally mounted in respect to the first member (20) and biased (34) theretowards, said second member (26) being in engagement with the under side of the counter (10), and means (46) drawing said second member (26) towards said first member (20) and into firm engagement with the bottom of the counter (10) biasing the unit (16) downwardly into place, said means (46) being accessible for manipulation to tighten or loosen from within the opening (14) area.

7. The combination of claim 6 in which said second member (26) is pivotally mounted for movement from an upright-like clamping position to a depending position as the unit (16) is removed from the opening (14) after removal of said drawing means (46).

8. The combination of claim 6 in which said drawing means (46) includes screw-type elements threadedly engageable with said second member (26) and extending into the unit.

9. The combination of claim 6 in which the counter engaging portion (50) of said second member (26) is formed to permit sliding movement thereof over the undersurface of said counter (10) in clamping and unclamping movements of said second member (26).

10. The combination of claim 6 in which the first member (20) includes an upper outwardly directed free flange (42) formed to aid in centering the unit (16) in mounting in the opening (14).

11. The combination of claim 6 in which the first member (20') includes a flange (62) disposed to limit pivotal movement of the second member (26') towards the first member (20') in the clamping movement of the second member (26').

References Cited

UNITED STATES PATENTS

| 2,646,575 | 5/1953 | Galley | 4—187 |
| 2,815,052 | 12/1957 | Krasnow | 269—239 X |
| 2,846,695 | 8/1958 | Hartog | 4—187 |
| 2,965,348 | 12/1960 | Gerslel et al. | 220—3.6 X |
| 2,971,666 | 2/1961 | Randall | 220—3.6 |
| 2,994,371 | 8/1961 | Morserth | 4—187 X |
| 3,022,519 | 2/1962 | Lang | 220—3.6 X |

FOREIGN PATENTS 583,962  9/1959  Canada.

BOBBY R. GAY, *Primary Examiner.*

DAVID J. WILLIAMOWSKY, *Examiner.*

G. O. FINCH, *Assistant Examiner.*